(12) United States Patent
Huang et al.

(10) Patent No.: US 9,549,206 B2
(45) Date of Patent: Jan. 17, 2017

(54) MEDIA DECODING METHOD BASED ON CLOUD COMPUTING AND DECODER THEREOF

(71) Applicant: PEKING UNIVERSITY, Beijing (CN)

(72) Inventors: Tiejun Huang, Beijing (CN); Wen Gao, Beijing (CN); Yonghong Tian, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 162 days.

(21) Appl. No.: 14/535,295

(22) Filed: Nov. 6, 2014

(65) Prior Publication Data
US 2015/0131917 A1    May 14, 2015

(30) Foreign Application Priority Data

Nov. 7, 2013    (CN) .......................... 2013 1 0551685

(51) Int. Cl.
| | |
|---|---|
| *G06K 9/00* | (2006.01) |
| *H04N 19/85* | (2014.01) |
| *H04N 19/50* | (2014.01) |
| *H04N 19/90* | (2014.01) |

(52) U.S. Cl.
CPC ........... *H04N 19/85* (2014.11); *G06K 9/00711* (2013.01); *G06K 9/00744* (2013.01); *G06K 9/00758* (2013.01); *H04N 19/50* (2014.11); *H04N 19/90* (2014.11)

(58) Field of Classification Search
None
See application file for complete search history.

(56) References Cited

U.S. PATENT DOCUMENTS

| 7,725,557 | B2 * | 5/2010 | Klemets | H04N 5/76 |
| | | | | 709/213 |
| 2011/0118858 | A1 * | 5/2011 | Rottler | H04L 63/08 |
| | | | | 700/94 |
| 2011/0289579 | A1 * | 11/2011 | Davis | G06F 21/554 |
| | | | | 726/12 |
| 2012/0047284 | A1 * | 2/2012 | Tarkoma | H04L 67/06 |
| | | | | 709/247 |
| 2012/0291078 | A1 * | 11/2012 | Weerasinghe | H04N 5/765 |
| | | | | 725/109 |
| 2014/0033239 | A1 * | 1/2014 | Wang | G06F 17/30967 |
| | | | | 725/13 |

* cited by examiner

*Primary Examiner* — Wesley Tucker
(74) *Attorney, Agent, or Firm* — Zareefa B. Flener; Flener IP Law, LLC

(57) ABSTRACT

A media decoding method based on cloud computing and decoder thereof are provided by embodiments of the present invention, which are easy to use and applicable to a media of any form, and its requirement for computer resource is low. The method includes: extracting representing features from a media code stream to be decoded; searching in the cloud for a media object which has similar representing features with the media code stream to be decoded by using a feature matching method and the representing features extracted; filling, replacing and improving parts or segments of the media code stream to be decoded with whole or parts of the media object.

10 Claims, 2 Drawing Sheets

MEDIA DECODING METHOD BASED ON CLOUD COMPUTING AND DECODER THEREOF

CROSS-REFERENCE TO RELATED APPLICATION

This application claims priority from CN Patent Application Serial No. 201310551685.4, filed on Nov. 7, 2013, the entire contents of which are incorporated herein by reference for all purposes.

FIELD OF THE INVENTION

The present invention is related to coding and decoding technology, especially related to a media decoding method based on cloud computing and decoder thereof.

BACKGROUND OF THE INVENTION

In the prior art, lossy compression is usually applied to a coding process, and within the same compressing standard, the bigger the compression ratio is, the larger the loss is. Thus decoding quality which is finally presented in a code stream compressed totally depends on compression methods and parameters used in the coding process.

In order to improve decoding quality of images or videos, mathematical algorithms are used to compensate lost pixels in lossy compression in the prior art. However, if an excellent decoding effect is desired, those mathematical algorithms are usually very complicated, and the computing requirement of the decoding side is very high, so that it is not practically applied. Moreover, since the essence of this method is estimating loss by using limited information of original images or videos, in this situation, the decoding effect will not be very good for those images or videos with poor quality.

Therefore, a new decoding method and decoder with lower computing complexity is required to improve decoding quality of various images or videos.

SUMMARY OF THE INVENTION

A media decoding method based on cloud computing and decoder thereof are provided by embodiments of the present invention, which are easy to use and applicable to a media of any form.

In an embodiment, a media decoding method based on cloud computing provided by an embodiment of the present invention includes:

extracting representing features from a media code stream to be decoded;

searching in the cloud for a media object which has similar representing features with the media code stream to be decoded by using a feature matching method and the representing features extracted;

filling, replacing and improving parts or segments of the media code stream to be decoded with whole or parts of the media object found.

In an embodiment, a decoder based on cloud computing provided by an embodiment of the present invention includes:

a feature extracting module, adapted to extract representing features from a media code stream to be decoded;

a feature matching module, adapted to search in the cloud for a media object which has similar representing features with the media code stream to be decoded by using a feature matching method and the representing features extracted;

an image processing module, adapted to fill, replace or improve parts or segments of the media code stream to be decoded with whole or parts of the media object found.

By using the technical scheme of the present invention, representing features are extracted from a media code stream to be decoded, no matter what is the form of the media code stream, or what is the resolution ratio; then a media object having similar representing features with the media code stream to be decoded is found in the cloud, and finally decoding quality of the media code stream is improved by using the detailed information in the media object found.

DETAILED DESCRIPTION OF THE INVENTION

The embodiments of the present invention are described more fully herein with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

Further, the order of the steps in the present embodiment is exemplary and is not intended to be a limitation on the embodiments of the present invention. It is contemplated that the present invention includes the process being practiced in other orders and/or with intermediary steps and/or processes.

Figure 1:
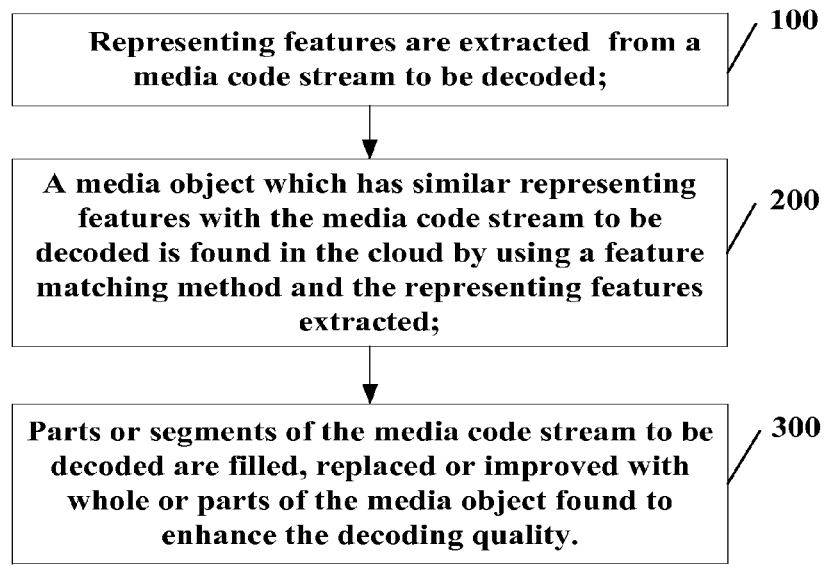
FIG. 1 illustrates a flow chart of a media decoding method based on cloud computing provided by an embodiment of the present invention.

FIG. 1 illustrates a flow chart of a media decoding method based on cloud computing provided by an embodiment of the present invention. As shown in FIG. 1, the method includes following steps.

Step 100: representing features are extracted from a media code stream to be decoded.

The media code stream to be decoded includes images, videos, audios and other media forms which may be felt by users through any audible or visual perception manner. Herein, the media code stream to be decoded may be a kind of compressed code stream which is coded based on any coding standard, or may be any primary media content captured by various sensor devices, or even may be an incomplete media code stream.

In this step, representing features may be pre-extracted from the media code stream, and then be stored in the media code stream during a coding process; so when the media code stream is required to be decoded, the representing features are directly obtained from the media code stream at a decoding side. Those skilled in the art can understand that, the representing features also may be directly extracted from the media code stream at a decoding side without being pre-extracted and stored.

The representing features may include local features and/or global features. Specifically, the global features may describe color histograms, color moments or gray co-occurrence matrixes. These global features only represent global information of the image, and cannot represent objects contained in the image. However, local features extract interested contents from image contents, and have sufficient description and distinction ability to describe media features. The local features are usually expressions describing one circular area.

Step 200: a media object which has similar representing features with the media code stream to be decoded is found in the cloud by using a feature matching method and the representing features extracted.

There are a lot of media objects in the cloud, and each media object has corresponding representing features. In order to improve efficiency of subsequent feature matching steps, these media objects may be chosen and their representing features may be pre-extracted in advance.

Step 300: parts or segments of the media code stream to be decoded are filled, replaced or improved with whole or parts of the media object found to enhance the decoding quality.

First, the media object found is transformed by being zoomed or rotated; and then brightness of the media object transformed may be further adjusted, herein, the adjustments of brightness include contrast stretching, mean value shift and so on; finally, the media object transformed and adjusted is used to fill, replace or improve parts or segments of the media code stream to be decoded.

In an embodiment of the present invention, multiple media objects may be obtained by using a feature matching method. After being transformed and adjusted, loss of the media objects are estimated, and the optimal media object is chosen or obtained according to a merging criterion, and is used to fill, replace or improve parts or segments of the media code stream to be decoded.

Even though a prior decoding process has been considered as sufficiently complete (for example, a TV completely decodes and restores a high-definition television media), the decoding effect could be further improved by using the technical scheme of the present invention (for example, a prior high-definition television media could be improved to a ultra high-definition television media).

Figure 2:
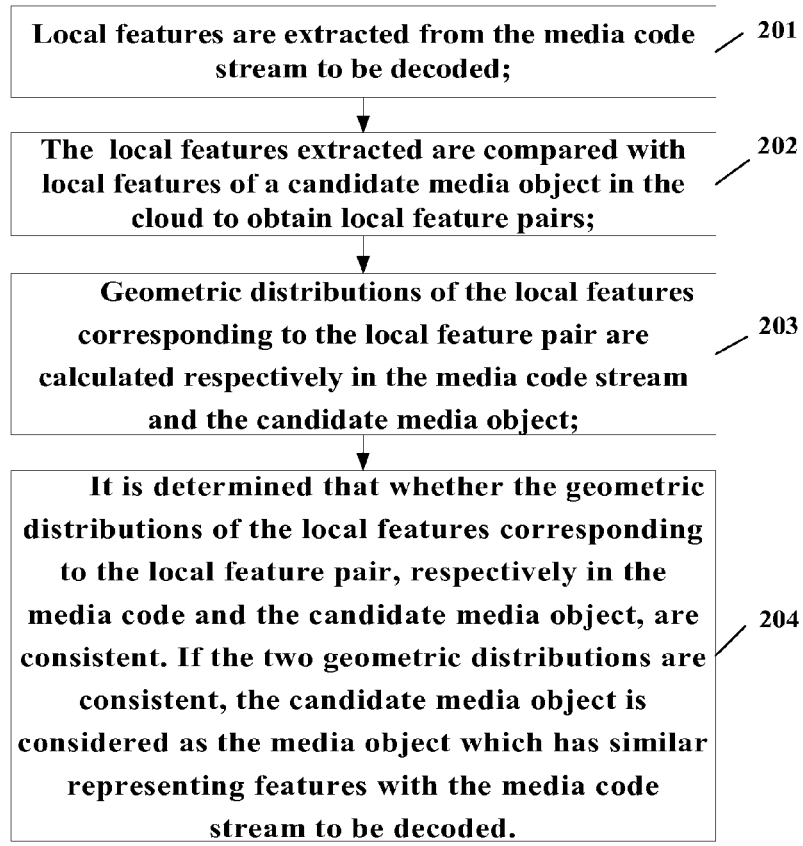
FIG. 2 illustrates a flow chart of a feature matching method provided by an embodiment of the present invention.

FIG. 2 illustrates a flow chart of a feature matching method provided by an embodiment of the present invention. As shown in FIG. 2, the feature matching method is provided to search in the cloud for a media object with reference to representing features extracted from a media code stream to be decoded, the method includes following steps.

Step 201: local features are extracted from the media code stream to be decoded. In an embodiment of the present invention, SIFT (Scale-invariant feature transform) may be used to extract local features from the media code stream. This step may be a repetition of Step 100, so when the local features has already been obtained by Step 100, Step 201 may be omitted.

Step 202: the local features extracted are compared with local features of a candidate media object in the cloud to obtain local feature pairs. Each local feature pair includes two identical or similar local features respectively extracted from the media code stream to be decoded and obtained from the candidate media object. The two local features which similarity degree is within a threshold range would be considered as similar.

Step 203: geometric distributions of the local features corresponding to the local feature pair are calculated respectively in the media code stream and the candidate media object.

Step 204: it is determined that whether the geometric distributions of the local features corresponding to the local feature pair, respectively in the media code and the candidate media object, are consistent. If the two geometric distributions are consistent, the candidate media object is considered as the media object which has similar representing features with the media code stream to be decoded.

For example, 1000 local features are extracted from a media code stream to be decoded and 800 local features are obtained from a candidate media object, and 200 local feature pairs are obtained through feature comparisons. Then geometric distributions of the local features corresponding to each of the 200 pairs are calculated respectively in the media code stream to be decoded and the candidate media object. If the geometric distributions of the local features corresponding to each of the 200 local feature pairs, respectively in the media code and the candidate media object, are considered as consistent, the candidate media object is considered as the media object which has similar representing features with the media code stream to be decoded. The media object may carry more detail information than the media code stream to be decoded, so that the decoding quality of the media code stream can be improved by using the media object found.

In an embodiment of the present invention, in order to improve feature matching efficiency, local features of a media code stream to be coded may be combined to obtain a global feature. A media object which has a similar global feature with the media code stream to be decoded is found in the cloud by using the feature matching method; then local features of the media code stream are compared with local features of the candidate media object. By using this method, the feature matching efficiency can be improved.

The feature matching method provided by an embodiment of the present invention is applicable to various situations. For example, when a media code stream to be decoded is a standard definition video, decoding quality of the standard definition video can be improved by obtaining similar contents from a media object found in the cloud, and then a high definition video is obtained.

Or, for media code streams formed after lossy compression, by referring to a media object found in the cloud, lost contents can be compensated to achieve a decoding quality close to original images or videos. In order to ensure fidelity of the decoding process (extra signal beyond the original images or videos is not produced), in an embodiment of the present invention, media objects (images or videos) which are used to improve the decoding process are limited within a finite set only shared by coders and decoders.

Figure 3:
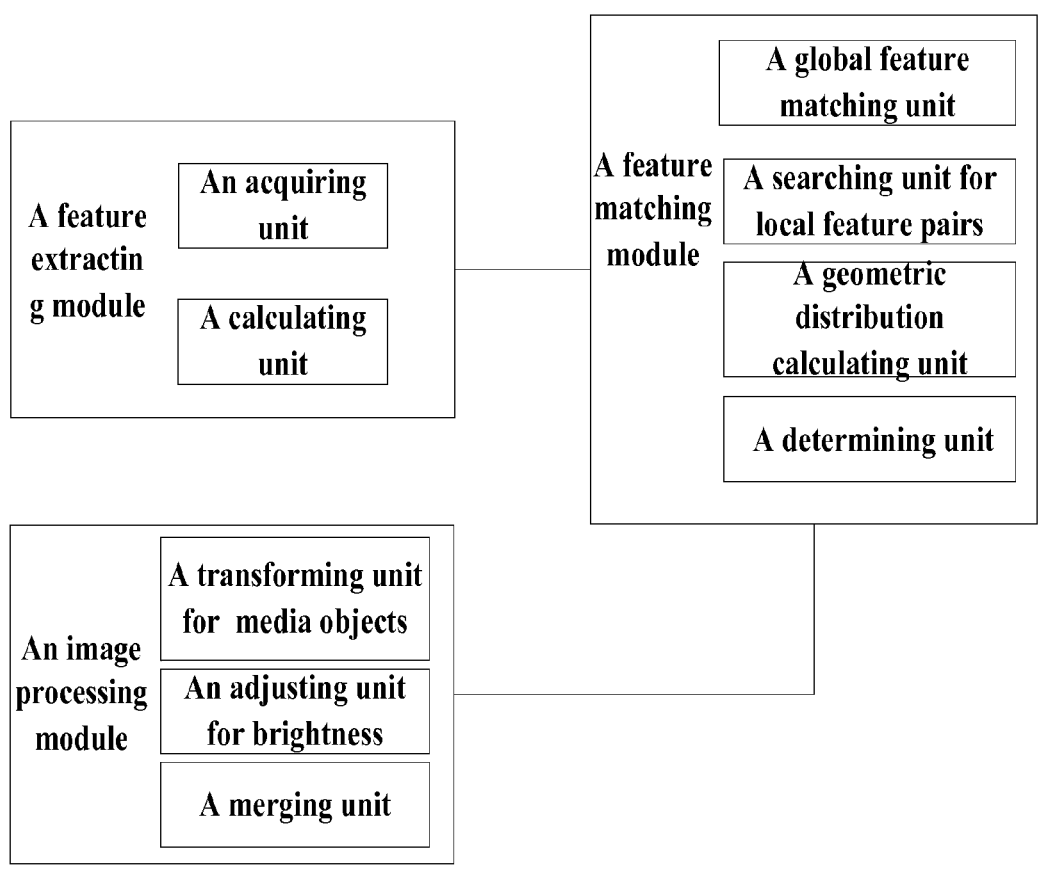
FIG. 3 illustrates a flow chart of a decoder based on cloud computing provided by an embodiment of the present invention.

A decoder based on cloud computing is provided by an embodiment of the present invention. As shown in FIG. 3, the decoder includes: a feature extracting module, adapted to extract representing features from a media code stream to be decoded; a feature matching module, adapted to search in the cloud for a media object which has similar representing features with the media code stream to be decoded by using a feature matching method and the representing features extracted; an image processing module, adapted to fill, replace or improve parts or segments of the media code stream to be decoded with whole or parts of the media object found.

In order to accelerate extracting speed of representing features, the feature extracting module may include two units: an acquiring unit, adapted to directly acquire representing features, which have been stored in the media code stream during a coding process, from the media code stream to be decoded; a calculating unit, adapted to calculate representing features with reference to the media code stream to be decoded.

Specifically, the feature matching module may further include: a searching unit for local feature pairs, adapted to compare local features extracted from the media code stream with local features of a candidate media object in the cloud in order to obtain a local feature pair; a geometric distribution calculating unit, adapted to calculate geometric distributions of the local features corresponding to the local feature pair respectively in the media code stream and in the candidate media object; a determining unit, adapted to determine whether the geometric distribution of the local features corresponding to the local feature pair in the media code stream is consistent with that in the candidate media object; when they are consistent, consider the candidate media object as the media object which has similar representing features with the media code stream to be decoded. Besides, the feature matching module may further include: a global feature matching unit, adapted to combine local features of a media code stream to be decoded to obtain a global feature; and search in the cloud for a media object having a similar global feature with the media code stream by using the feature matching method; then the searching unit for local feature pairs is adapted to compare the local features extracted by the feature extracting module with the local features of the candidate media objects obtained by the global feature matching unit.

Specifically, the image processing module may include: a transforming unit for media objects, adapted to transform the media object found to conform the shape of the media code stream; an adjusting unit for brightness, adapted to adjust brightness of the media object transformed; a merging unit, adapted to obtain the optimal media object with reference to multiple media objects transformed and adjusted, and fill, replace or improve parts or segments of the media code stream to be coded with the optimal media object.

The above embodiments are only preferred embodiments of the present invention and cannot be used to limit the protection scope of the present invention. Those skilled in the art can understand that, the technical scheme of the embodiment may still be modified or partly equivalently substituted; and the modification or substitution should be considered within the spirit and protection scope of the present invention.

The invention claimed is:

1. A media decoding method based on cloud computing, comprising:
    extracting representing features from a media code stream to be decoded;
    searching in the cloud for a media object which has similar representing features with the media code stream to be decoded by using a feature matching method and the representing features extracted;
    filling, replacing and improving parts or segments of the media code stream to be decoded with whole or parts of the media object found;
    wherein the representing features are local features; searching in the cloud for a media object which has similar representing features with the media code stream to be decoded by using a feature matching method and the representing features extracted comprises:
    comparing the local features with local features of a candidate media object in the cloud to obtain a local feature pair;
    calculating geometric distributions of the local features corresponding to the local feature pair respectively in the media code stream and the candidate media object;
    determining whether the geometric distributions of the local features corresponding to the local feature pair in the media code stream, respectively in the media code and the candidate media object, are consistent;
    considering the candidate media object as the media object which has similar representing features with the media code stream to be decoded, if the two geometric distributions are consistent.

2. The method of claim 1, wherein, extracting representing features from a media code stream to be decoded comprises:
    directly acquiring representing features, which have been stored in the media code stream during a coding process, from the media code stream; or
    calculating representing features based on the media code stream to be decoded.

3. The method of claim 1, wherein, before comparing the local features with local features of a candidate media object in cloud to obtain a local feature pair, the method further comprises:
    combining local features of the media code stream to obtain a global feature;
    searching in the cloud for a candidate media object matching the global feature of the media code stream by using the feature matching method.

4. The method of claim 1, wherein, SIFT (Scale-invariant feature transform) is used for extracting the local features from the media code stream.

5. The method of claim 1, wherein, filling, replacing and improving parts or segments of the media code stream to be decoded with whole or parts of the media object found comprises:

- transforming the media object found to conform the shape of the media code stream;
- adjusting brightness of the media object transformed;
- obtaining the optimal media object according to a merging criterion with reference to multiple media objects adjusted;
- filling, replacing or improving parts or segments of the media code stream to be coded with the optimal media object.

6. The method of claim 1, wherein, the media code stream comprises images, videos and audios.

7. A tangible decoder based on cloud computing, comprising:

- a feature extracting module, adapted to extract representing features from a media code stream to be decoded;
- a feature matching module, adapted to search in the cloud for a media object which has similar representing features with the media code stream to be decoded by using a feature matching method and the representing features extracted;
- an image processing module, adapted to fill, replace or improve parts or segments of the media code stream to be decoded with whole or parts of the media object found;

wherein the feature matching module comprises:

- a searching unit for local feature pairs, adapted to compare local features extracted from the media code stream with local features of a candidate media object in the cloud to obtain a local feature pair;
- a geometric distribution calculating unit, adapted to calculate geometric distributions of the local features corresponding to the local feature pair respectively in the media code stream and in the candidate media object;
- a determining unit, adapted to determine whether the geometric distributions of the local features corresponding to the local feature pair in the media code stream, respectively in the media code and the candidate media object, are consistent and consider the candidate media object as the media object which has similar representing features with the media code stream to be decoded, if the two geometric distributions are consistent.

8. The tangible decoder of claim 7, wherein, the feature extracting module comprises:

- an acquiring unit, adapted to directly acquire representing features, which have been stored in the media code stream during a coding process, from the media code stream; and/or
- a calculating unit, adapted to calculate representing features with reference to the media code stream to be decoded.

9. The tangible decoder of claim 7, wherein, the feature matching module further comprises:

- a global feature matching unit, adapted to combine local features of the media code stream to obtain a global feature; and search in the cloud for a media object having a similar global feature with the media code stream by using the feature matching method;
- the searching unit for local feature pairs is further adapted to compare the representing features extracted by the feature extracting module with the local features of the candidate media object obtained by the global feature matching unit.

10. The tangible decoder of claim 7, wherein, the image processing module comprises:

- a transforming unit for media objects, adapted to transform the media object found to conform the shape of the media code stream;
- an adjusting unit for brightness, adapted to adjust brightness of the media object transformed;
- a merging unit, adapted to obtain the optimal media object with reference to multiple media objects transformed and adjusted, and fill, replace or improve parts or segments of the media code stream to be coded with the optimal media object.

* * * * *